Nov. 17, 1925.
H. W. HOW
1,561,544
VALVE OPERATING MECHANISM
Filed Jan. 14, 1924     2 Sheets-Sheet 1
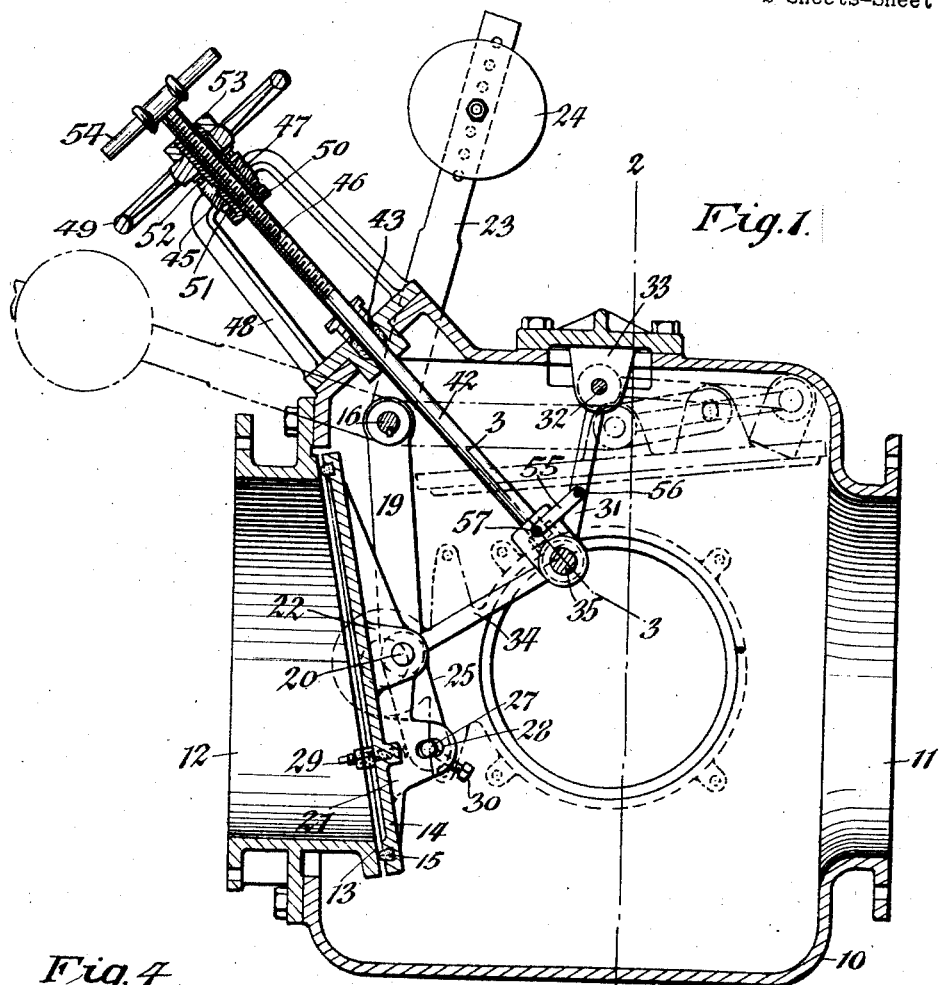
Fig.1.
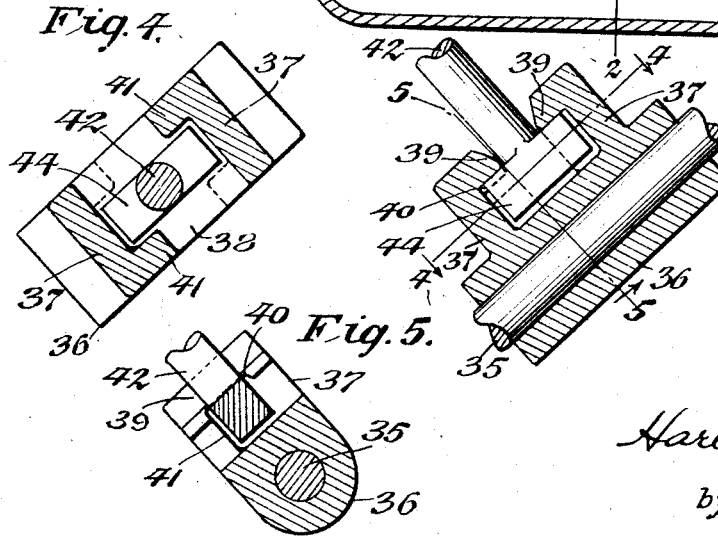
Fig.4.
Fig.3.
Fig.5.
INVENTOR
Harlan W. How
by Ralph L. Powers
Atty's.

Nov. 17, 1925.
H. W. HOW
1,561,544
VALVE OPERATING MECHANISM
Filed Jan. 14, 1924
2 Sheets-Sheet 2
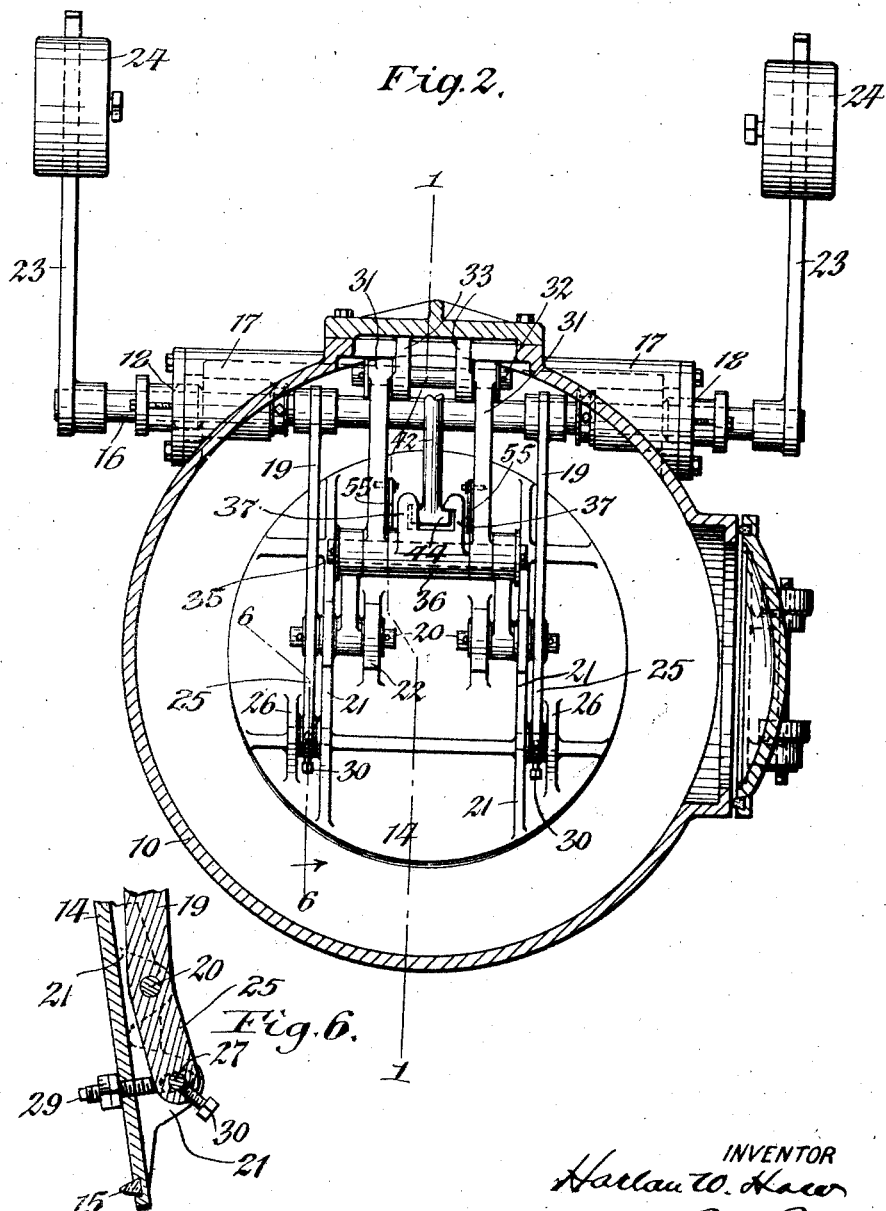
INVENTOR
Harlan W. How
by Potter Powers
Atty's.

Patented Nov. 17, 1925.

1,561,544

UNITED STATES PATENT OFFICE.

HARLAN W. HOW, OF BUFFALO, NEW YORK, ASSIGNOR TO BUFFALO FOUNDRY & MACHINE COMPANY, OF BUFFALO, NEW YORK, A CORPORATION OF NEW YORK.

VALVE-OPERATING MECHANISM.

Application filed January 14, 1924. Serial No. 686,239.

*To all whom it may concern:*

Be it known that I, HARLAN W. How, a citizen of the United States, residing at Buffalo, in the county of Erie and State of New York, have invented a new and useful Improvement in Valve-Operating Mechanism, of which the following is a specification.

This invention relates to a valve operating mechanism which is more particularly designed for operating valves of large dimensions and which when in use must form a tight closure, such valves being used, for instance, in connection with vacuum evaporating pans and similar installations.

It is the object of this invention to provide strong, durable and efficient means whereby a valve of this character may be tightly closed and yet opened very wide when this becomes necessary without, however, occupying undue space. With this object in view this invention comprises a valve operating mechanism which has among other features of construction means whereby the valve gate or disk may be tightly pressed against its seat, means for opening the valve widely, and means whereby the valve opening and the valve tightening mechanism may be coupled and uncoupled easily and conveniently from the exterior of the valve casing and which also permit of readily adjusting the valve gate or disk to its seat so that they bear against each other properly and provide a tight closure.

In the accompanying drawings:

Figure 1 is a vertical longitudinal section of a valve equipped with my improved mechanism for operating the gate or disk thereof, taken on line 1—1, Figure 2.

Figure 2 is a vertical cross section taken on line 2—2, Figure 1.

Figure 3 is a fragmentary section, on an enlarged scale, taken on line 3—3, Figure 1.

Figure 4 is a transverse section taken on line 4—4, Figure 3.

Figure 5 is a vertical section, taken on line 5—5, Figure 3.

Figure 6 is a fragmentary vertical section, on an enlarged scale, taken on line 6—6, Figure 2.

Similar characters of reference refer to like parts in the several figures.

The numeral 10 represents the enclosing casing or housing of the valve which is provided at one end with an inlet 11 and at its other end with an outlet 12, and between said inlet and outlet with an annular valve seat 13 which is preferably inclined.

Arranged within the housing and movable toward and from the valve seat 13 for the purpose of either closing the passage through the valve casing or clearing the same is a valve disk or gate 14 which is preferably of circular form and provided on its face with a packing 15 for engagement with the valve seat 13 in order to produce a tight joint therewith when the valve is closed.

This valve gate or disk is adapted to be moved through an arc of considerable extent toward and from the valve seat 13 within the casing so as to either bear against the valve seat or to entirely clear the path or conduit leading from the inlet to the outlet of the valve casing by means which are actuated manually from the exterior of the casing. These means in their general organization comprise a rock shaft 16 which in the present instance is arranged horizontally and passes transversely through the upper part of the valve casing, those parts of the shaft which extend through the walls of the casing being journaled in bearings 17, 17 on the casing, which latter are provided with stuffing boxes 18 so as to form a leak tight joint between the casing and this rock shaft. Within the casing this rock shaft has secured thereto the upper ends of two shifting arms 19 which are spaced apart and arranged on opposite sides of the center of the valve disk or gate and are pivotally connected at their lower ends with the back side of the valve gate or disk by means of horizontal pivot pins 20, each of which passes transversely through the inner end of one of the arms 19 and a rib 21 and lug 22 on the adjacent part of the back side of the valve gate. On the exterior of the valve casing the opposite ends of the rock shaft 16 are provided with two weight arms 23, each of which is provided at its outer extremity with a weight 24.

By means of the arms 23 the valve gate 14 may be moved within the casing either into its open or closed position and these arms are so arranged that when the valve gate is in its closed position these weight arms are in rear of a vertical line extending through the shaft 16 so that the weights 24 operate to hold the valve gate in its closed position, as shown by full lines in Figure 1, while upon moving these weight arms to a position in front of a vertical line extending through the shaft 16, these weighted arms serve to yieldingly hold the valve gate in its widely open position in which it is arranged above the main path of the conduit through the valve casing, as shown by dotted lines in Figure 1. The valve gate is capable of being rocked on the pivot pins 20 for the purpose of causing the packing 15 on its front face to bear evenly and uniformly on all parts of the valve seat 13 and also to take up any unevenness in the wear of the same if this should occur.

For this purpose the inner end of each of the valve arms 19 is provided with an extension 25 which projects downwardly therefrom below the pivot 20, between the adjacent rib 21 and an adjusting lug 26 arranged adjacent to the outer side of the rib 21, an adjusting pin 27 passing through the lower end of each arm extension 25 and through longitudinal slots 28 formed in the adjacent parts of the respective ribs 21 and adjusting lug 26, a front adjusting screw 29 working in a threaded opening in the valve gate and bearing against the front side of the respective arm extension 25, and a rear clamping screw 30 arranged in a threaded opening in the lower rear part of one of the arm extensions 25 and engaging with the pin 27 for holding the same in place. By turning these screws 29 forwardly or backwardly, the valve gate or disk 14 will be rocked on the pivot pins 20 so that its front face may be disposed parallel with the valve seat 13 in the closed position of the gate and thereby cause these parts to fit evenly against each other and form a tight closure.

Upon the upper part of the valve casing and arranged partly within the same in rear of the gate or disk and also partly outside of the casing is arranged the mechanism whereby a powerful pressure may be applied to the gate for holding the same shut and also the means for rendering this power pressure device operative or inoperative as the occasion requires.

In its general organization, this power pressure device comprises a toggle mechanism which in the present case consists of two pairs of toggle arms or links, the links of the two pairs being arranged side by side on opposite sides of the center of the valve gate and the links of each pair consisting of an upper link 31 which is pivotally connected by means of a horizontal transverse pin 32 with a lug 33 depending from the upper side of the valve casing and a lower link 34 which is pivotally connected at its lower end with the valve gate by means of the same pin 20 which connects one of the valve arms 19 with the gate, the opposing or proximate ends of the upper and lower links of both pairs being connected with each other, respectively, by means of a horizontal transverse pin 35, as shown in Figures 1 and 2. Upon moving the opposing ends of the two pairs of toggle links backwardly in the valve casing, the same will be folded upwardly against the underside of the rear part of the top of the valve casing and carry the valve gate upwardly into a substantially horizontal position in which the same wholly clears the path from the inlet to the outlet of the valve casing, as shown by dotted lines in Figure 1. Upon moving the opposing ends of the two pairs of the toggle links downwardly and forwardly so that these links are unfolded the valve gate will be moved downwardly and forwardly toward the valve seat 13, as shown by full lines in Figure 1. The valve gate is movable into either this closed position or into its widely opened position and the toggle mechanism is folded or unfolded in the manner described, while the toggle mechanism may be disconnected from the power operating means during which time the valve gate and part associated therewith may be shifted solely by the rocking of the shaft 16 which is effected from the exterior of the valve casing by manipulation of one or the other of the weighted arms 23. When the valve gate is in its closed position, the same may be firmly pressed against its seat for producing a tight joint therebetween by power means which operate upon the toggle mechanism so as to tend to further straighten or unfold the toggle links and cause them to exert a heavy pressure against the rear side of the valve.

The preferred mechanism for this purpose which is shown in the drawings is so designed that the same may be operated from the exterior of the valve casing and operatively connected with or disconnected from the toggle mechanism so as to permit of rendering this power mechanism either operative or inoperative. Accordingly a coupling block 36 is provided which is mounted upon the pivot pin 35 between the upper links 31 of the two pairs and provided on its upper side with a socket which is formed by means of two upwardly projecting lugs 37, 37 which are spaced apart to form a passage 38 therebetween, the upper ends of these lugs being provided with inwardly projecting lips 39, each of which is provided on its underside with a recessed or undercut seat 40 and the said lugs 37 being provided on diagonally opposite edges with stop flanges or shoulders 41. The numeral 42 represents a longitudinally movable valve stem or shifting rod which has its inner end arranged within the upper part of the valve casing and its upper part arranged externally thereof, while its intermediate part is slidable lengthwise through a stuffing box 43. In the upper part of the valve casing this valve stem is provided at its lower end with a T-head 44 which is adapted to be connected with and disconnected from the coupling head 36 by first passing the T-head 44 downwardly between the lips 39 while this T-head or cross piece 44 is arranged in a direction lengthwise of the valve. After this head has passed below the lips 39 of the lugs 37, the same is turned so that the opposite ends thereof are arranged underneath the lips 39 and thereafter the valve stem is again drawn outwardly so that the opposite ends of the T-head 44 engage with the recessed seat 40 on the underside of the lips 39, as shown in Figures 3 and 5. Rotation of the T-head 44 in this direction is limited by engagement of its opposite ends with the stops 41 which renders it possible to determine that the T-head is in the proper position to engage with the undersides of the coupling lips 39.

For the purpose of uncoupling the valve stem 42 from the coupling block 36 this stem is first moved inwardly slightly so as to disengage the opposite ends of its T-head from the recessed seat 40, after which the rod may be turned in the direction for moving the opposite ends of the T-head 44 from underneath the coupling lips 39 and into a position in which this T-head is arranged lengthwise between these lugs, after which the valve stem together with its T-head may be detached from the coupling block. Upon moving the valve stem longitudinally upward and outward, while the same is coupled with the block 36, a powerful pressure is exerted by the toggle mechanism against the valve gate for securely holding the same in its closed position. This outward movement as well as its inward movement for releasing the pressure of the gate against the valve seat is effected by means of a rotary screw sleeve 45 which is provided with an internal screw thread engaging with an external screw thread 46 on the outer part of the valve stem, this sleeve being capable of rotation but held against longitudinal movement by journaling the same in a relatively stationary bearing 47 which is mounted on the adjacent part of the casing by means of a bracket 48. The turning of this screw sleeve is effected by means of a hand wheel 49 secured to this screw sleeve adjacent to the outer end of the bearing 47 and longitudinal movement of this screw sleeve is prevented by means of an inner flange 50 arranged on the inner end of this screw sleeve and engaging by means of an interposed ball bearing 51 with the inner end of the bearing 47, a ball bearing 52 interposed between the outer end of the bearing 47 and the inner side of the hand wheel 49, and a clamping screw nut 53 arranged on the outer end of the screw sleeve and bearing against the outer side of the hand wheel 49, as shown in Figure 1. Rotary motion of the valve stem 42 for the purpose of connecting and disconnecting the T-head 44 from the coupling block 36 is effected from the exterior of the valve casing by means of a cross piece or handle 54 secured to the upper or outer end of the valve stem, as shown in Figure 1.

For the purpose of preventing displacement of the coupling block 36 relative to the toggle links when this block is disconnected from the valve stem 42, retaining means are provided which preferably consist of two retaining links 55 each of which is pivotally connected at its upper end by means of a pin 56 with one of the upper links 31, while its lower end is pivotally connected by means of a pin 57 with one side of the coupling block 36, as shown in Figures 1 and 2. Due to this construction of retaining device the coupling block 36 will always be held in its proper position centrally between the upper and lower pivot pins 32 and 20 and axially in line with the valve stem 42 so that these members may be readily coupled with each other when the toggle mechanism is unfolded and the valve gate is in its closed position.

It will be apparent from the foregoing that when the valve stem is thus coupled with the toggle mechanism, a very powerful thrust may be exerted against the valve gate for holding the same absolutely tight by turning the screw sleeve in the direction which will cause the valve stem to be moved outwardly and thereby increasing the straightening or unfolding action of the toggle mechanism, while upon moving this valve stem in the opposite direction the toggle mechanism is loosened and the valve stem may be detached therefrom. It is also obvious that when the valve stem is detached from the toggle mechanism, it will be possible to rapidly and readily move the valve gate manually through an arc of considerable extent, either into its closed position in which it extends across the conduit of the valve casing and engages with the valve seat thereof when it is desired to shut the valve, as well as move the same into a position in which it wholly clears the conduit of the valve casing and thus permits an unrestricted flow of matter through the same, or passage therethrough.

This valve operating mechanism therefore provides convenient and readily operable means which are slow in action for producing a powerful pressure whereby the valve gate may be held closed and also a quick acting mechanism having a wide range of movement for shifting the valve gate either to its closed position or into a position which is wholly on one side of the path through which the matter flows when the valve is open.

The powerful toggle mechanism also permits of forcibly opening the valve disk or gate if for any reason the same should tend to stick and the same also permits of easily opening the gate or valve in case the opening of the valve is resisted either by the sucing of a vacuum on the front side of the same or by the pressure of any agent against the rear side of the same.

I claim as my invention:

1. A valve comprising an enclosing casing having a valve seat, a valve disk movable toward and from said seat, and means for operating said valve disk comprising an operating arm pivotally mounted at one end on said casing and pivotally connected at its opposite end with said valve disk, and means for adjusting the angular position of said valve disk relatively to said arm.

2. A valve comprising an enclosing casing having a valve seat, a valve disk movable toward and from said seat, and means for operating said valve disk comprising an operating arm pivotally mounted at one end on said casing and pivotally connected at its opposite end with said valve disk, and means for adjusting the angular position of said valve disk relatively to said arm comprising an extension arranged on said arm, and an adjusting screw mounted on said valve disk and engaging with said extension.

3. A valve comprising an enclosing casing having a valve seat, a valve disk movable toward and from said seat, and means for operating said valve disk comprising an operating arm pivotally mounted at one end on said casing and pivotally connected at its opposite end with said valve disk, and means for adjusting the angular position of said valve disk relatively to said arm comprising a projection arranged on said valve disk and provided with a slot, an extension on said arm provided with a pin arranged in said slot, an inner adjusting screw arranged on the valve disk and engaging with the inner side of said extension, and an outer clamping screw mounted on said extension and engaging with said pin.

4. A valve comprising an enclosing casing having a valve seat, a valve disk movable toward and from said seat, and means for operating said valve disk comprising an operating arm pivotally mounted at one end on said casing and pivotally connected at its opposite end with said valve disk, a pair of toggle links having their proximate ends pivotally connected and their opposite ends pivotally connected with the valve disk and casing, respectively, and means for actuating said operating arm for moving said links into a folded or unfolded position.

5. A valve comprising an enclosing casing having a valve seat, a valve disk movable toward and from said seat, and means for operating said valve disk comprising an operating arm pivotally mounted at one end on said casing and pivotally connected at its opposite end with said valve disk, a pair of toggle links having their proximate ends pivotally connected and their opposite ends pivotally connected with the valve disk and casing, respectively, and means for actuating said operating arm for moving said links into a folded or unfolded position and a longitudinally movable valve stem mounted on the casing and connected with said toggle links.

6. A valve comprising an enclosing casing having a valve seat, a valve disk movable toward and from said seat, and means for operating said valve disk comprising an operating arm pivotally mounted at one end on said casing and pivotally connected at its opposite end with said valve disk, a pair of toggle links having their proximate ends pivotally connected and their opposite ends pivotally connected with the valve disk and casing, respectively, and means for actuating said operating arm for moving said links into a folded or unfolded position and a longitudinally movable valve stem mounted on the casing and detachably connected with said toggle links.

7. A valve comprising an enclosing casing having a valve seat, a valve disk movable toward and from said seat, and means for operating said valve disk comprising an operating arm pivotally mounted at one end on said casing and pivotally connected at its opposite end with said valve disk, a pair of toggle links having their proximate ends pivotally connected and their opposite ends pivotally connected with the valve disk and casing, respectively, and means for actuating said operating arm for moving said links into a folded or unfolded position, a coupling block pivotally connected with said links and having coupling lugs provided on their opposing sides with undercut seats, and a valve stem mounted on said casing so as to be capable of longitudinal and rotary movement and having a cross head adapted to engage its opposite ends with the undercut seats of said coupling block.

8. A valve comprising an enclosing casing having a valve seat, a valve disk movable toward and from said seat, and means for operating said valve disk comprising an operating arm pivotally mounted at one end on said casing and pivotally connected at its opposite end with said valve disk, a pair of toggle links having their proximate ends pivotally connected and their opposite ends pivotally connected with the valve disk and casing, respectively, and means for actuating said operating arm for moving said links into a folded or unfolded position, a coupling block mounted on the pivotal connection between said links, a valve stem mounted on the casing and detachably connected with said coupling block, and means for holding said block in a central position between said links.

9. A valve comprising an enclosing casing having a valve seat, a valve disk movable toward and from said seat, and means for operating said valve disk comprising an operating arm pivotally mounted at one end on said casing and pivotally connected at its opposite end with said valve disk, a pair of toggle links having their proximate ends pivotally connected and their opposite ends pivotally connected with the valve disk and casing, respectively, and means for actuating said operating arm for moving said links into a folded or unfolded position, a coupling block mounted on the pivotal connection between said links, a valve stem mounted on the casing and detachably connected with said coupling block, and means for holding said block in a central position between said links comprising a retaining link connecting said coupling block with one of said toggle links.

10. A valve comprising an enclosing casing having a valve seat, a valve disk movable toward and from said seat, and means for operating said valve disk comprising an operating arm pivotally mounted at one end on said casing and pivotally connected at its opposite end with said valve disk, a pair of toggle links having their proximate ends pivotally connected with each other and their opposite ends pivotally connected with the casing and valve disk, respectively, a longitudinally movable valve stem passing through the casing and detachably connected at its inner end with said links, a screw nut working on the external part of said valve stem and having a handle, and a bracket arranged on the exterior of the casing and having a bearing in which said screw nut is capable of turning but is held against longitudinal movement.

In testimony whereof I affix my signature.

HARLAN W. HOW.